Patented Aug. 11, 1942

2,292,632

UNITED STATES PATENT OFFICE 2,292,632

ADSORBENT MATERIAL AND PROCESS OF MANUFACTURING SAME

Herbert H. Greger, Washington, D. C.

No Drawing. Application July 6, 1938, Serial No. 217,777

4 Claims. (Cl. 210—205)

This invention relates to a bonded adsorbent material, and more particularly to a bonded, activated, metallic adsorbent oxide. While the product is particularly adapted for filtration purposes, its properties permit the use of the material in other fields.

While adsorbent materials have been bonded heretofore, it has been customary to activate the material, then bond the activated material, and finally, because of the bonding step, reactivate the bonded material. Such a process has been open to objection on the ground of expense and also the fact that there has been a material loss in adsorption efficiency.

One of the objects of my invention is to overcome the objections to the above process previously used.

Another object of my invention is to provide a method of bonding an unactivated adsorbent, and subsequently activating the bonded product.

Still another object of my invention is to provide a product comprising particles of an activated metallic oxide bonded with sodium silicate.

To accomplish the above, and other important objects, my invention in general comprises the bonding of an unactivated adsorbent material and subsequent activation of the bonded product. More specifically, it embraces the concept of bonding particles of a hydrated metallic oxide by the use of an alkali metal silicate, such as sodium silicate, and then subsequently dehydrating the metallic oxide. I prefer that the adsorbent shall be a dehydrated oxide of aluminum, magnesium, or iron, because of their capacity to absorb certain materials as well as possessing adsorption properties. For reasons of economy, where the particular adsorbent used reacts with the sodium silicate at only a high temperature, I usually incorporate with the hydrate another oxide, such as zinc oxide, for instance, which will react with the sodium silicate at a lower temperature.

I shall describe my invention with reference to the manufacture of an alumina product, but this is to be taken merely for purposes of illustration, and it will be appreciated that the same underlying principles apply for other oxides. The process may be best illustrated by referring to certain laboratory operations.

In one instance, I used as the adsorbent material 100 grams of a good grade of raw Arkansas bauxite of less than 100 mesh. While the adsorbent may be a refined or purified chemical compound, I usually prefer to start with a natural mineral for reasons of economy, and hence the use of bauxite in this instance. With respect to the particle size, it is to be noted that this may be widely varied. For instance, in addition to the 100 mesh size indicated above, I have, on other occasions, used a size of 30–60 mesh, and, again, a size of 60–90 mesh. The precise size, of course, will depend upon the type of bauxite used, the uses to which the product is to be put, etc.

The bonding material in the case above cited was made up by first combining equal parts of water and "J" brand sodium silicate. It should be stated that silicates of the other alkali metals may be used in lieu of sodium silicate. The sodium silicates now available vary in their soda-silica ratios as well as water ratios, but I have found that my invention may be carried out with practically all of the commercial sodium silicates now on the market. The silicate of soda may be concentrated or it may be cut with water. In either case, the bonded product is hard and tough after it is baked, but when dilute silicate is mixed with the hydrate the initial mix is of a consistency of wet sand, thus tending to make the molding step difficult.

I have found that the addition of clay to the sodium silicate solution increases the consistency of the initial mix to some extent, and also improves the bond, as well as effecting a slight economy. I have also found that clay improves the mechanical filtration properties of the filter body inasmuch as it has a relatively rough surface as opposed to the smooth glassy surface of the silicate of soda after baking.

This clay, of course, is not an essential ingredient of the bonding material, but I ordinarily prefer to use from 5 to 25 grams of a clay, such as kaolinite or bentonite, to 100 grams of sodium silicate solution. The exact amount of clay to be added to the sodium silicate solution will depend upon the concentration of the latter, the desired structure of the finished product, etc. In general, however, the amount of clay should increase with an increase in dilution of the sodium silicate solution, but if a very open structure is desired in the finished product the clay should be kept at a minimum in view of its tendency to plug the interstices between the particles.

In the specific example here described, I added 10 grams of kaolinite to 100 grams of the sodium silicate-water solution mentioned above.

To the 100 grams of bauxite, mentioned at the outset, I added 35 grams of the sodium silicate-kaolinite-water solution, which amount of bonding mixture would hold regardless of whether clay is included or not. Of course, there may be a variance in the amount of bonding material that is employed, the exact amount usually being determined by the nature of the precise adsorbent and the use to which the product will be put.

While I do not wish to be limited to any particular theory, it is my belief that the sodium silicate solution reacts with the metallic hydrate to form a sodium silicate of the metal—in the above specific example, forming sodium aluminum silicate. Inasmuch as this reaction in the case of the hydrates of aluminum, magnesium, and iron requires a relatively high temperature, I have found, as mentioned above, that by mixing with the hydrate some other oxide which reacts with the sodium silicate at a lower temperature, an economy may be effected. Of course, instead of initially mixing this other oxide with the hydrate, it may be added to the sodium silicate solution and then this mix, in turn, mixed with the adsorbent.

Zinc oxide, I have found, serves admirably as such additive oxide, by reason of its cheapness and availability, as well as its low temperature of reaction. For instance, zinc oxide will react with the sodium silicate to form sodium zinc silicate at a temperature of around 230° C., whereas the reaction temperature for aluminum is in the neighborhood of 500° or 600° C. The amount of zinc oxide that is used is roughly the quantity necessary to form the required amount of sodium zinc silicate to effectively bond the adsorbent, although, of course, variations may be made in this amount where necessary. In the above example where 100 grams of bauxite are used with 30 grams of the bonding reagent, I have found that 1 gram of zinc oxide is sufficient.

In lieu of the sodium silicate-water-clay bonding agent mentioned above, I have found that the bonding may be effected very successfully by an emulsion of vegetable or animal oil in dilute silicate of soda. For instance, "C" brand sodium silicate may be diluted with an equal quantity of water, to which solution 5 to 20 per cent by weight of vegetable or animal oil may be added. This resulting mix may be stirred vigorously and heated slightly, if necessary. The vegetable or animal oil apparently reacts with the alkali of the silicate to form soap and glycerin, which in turn serve as emulsifying agents for the rest of the oil, if any is left. A thick emulsion thereby forms which may be used for bonding the bauxite in the usual way. The oil, on activation of the adsorbent material, burns out, and it does not materially affect the reaction of the silicate with the metallic oxide. An advantage of this type of bonding reagent resides in the fact that a dilute silicate solution may be used, which is thickened by the oil, and, when the oil burns out, a more porous bond is formed than when the straight silicate or silicate-clay bond is used.

Clay may, or may not, be used with the emulsified bonding agent, as in the case of the straight silicate bond.

After the bauxite and particular bonding agent are thoroughly mixed, there is formed a wet homogeneous agglomerate. In this condition the mass may be molded to any desired shape or form, depending upon the use to which the finished product will be put.

As indicated above, my product is particularly desirable as a filter block, and therefore the molding may be for the purpose of forming the mass into blocks of the desired shape and size. However, my invention is of particular value in that it makes possible the utilization of fines, which heretofore have had no commercial value as an adsorbent. With such fines it is frequently desirable to make a bonded product of relatively small size, as distinguished from a filter block. In such a case the agglomerated mix of the adsorbent and bonding material may be extruded through a press and then broken up into small particles or short lengths.

After molding, or extrusion, the material may be dried and activated in separate steps, but I have found that a combined rapid drying and baking step is not only more economical, but in some cases it serves to prevent cracking of the molded product.

As indicated above, the raw bauxite is, of course, unactivated. While my invention contemplates activation of the adsorbent prior to bonding, I find that the best results are obtained by activating the bonded product, and one of the salient advantages of my invention is this fact, that I may postpone the dehydration of the bauxite until after bonding. The use to which the final product is to be put will govern the degree of activation which is necessary, and this, in turn, will govern the baking temperature employed. In general the molded or extruded matrial will be raised to a temperature of from 250 to 750° C.

The final product, whether in molded or granular form, constitutes an efficient filter. It serves as a mechanical filter to remove dust, grit, carbon, and other solid matter, and, in addition, serves to adsorb and absorb other foreign materials in the fluids undergoing treatment.

While the product is particularly adapted for filtration, it also finds application in other industrial fields, such as, for instance, for heat and sound insulation. In such cases the material may be molded into the shape of bricks, tiles, wall boards, or any other desirable shapes.

While I have shown and described the preferred embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. A method of forming a porous adsorbent filter material comprising mixing a hydrated metallic oxide selected from the group consisting of aluminum, iron and magnesium, an agent containing a silicate of an alkali metal, and a relatively small amount of another oxide adapted to react with the silicate at a temperature lower than the first mentioned oxide, and then heating said mix to a temperature high enough to activate the oxide.

2. A method of forming a porous adsorbent filter material comprising mixing a hydrated metallic oxide selected from the group consisting of aluminum, iron and magnesium, an agent containing a silicate of an alkali metal, and an oil containing the fatty acid radical, and then heating said mix to a temperature high enough to activate the oxide.

3. A method of forming a porous adsorbent filter material comprising mixing a hydrated metallic oxide selected from the group consisting of aluminum, iron and magnesium, an agent containing a silicate of an alkali metal, and a relatively small amount of clay, and then heating said mix to a temperature high enough to activate the oxide.

4. A method of forming a porous adsorbent filter block comprising mixing together unactivated bauxite and a smaller quantity of sodium silicate, molding said mix to form the desired shape of filter block, and then heating said blocks to a temperature high enough to activate the bauxite.

HERBERT H. GREGER.